US010882090B2

(12) United States Patent
Froböse et al.

(10) Patent No.: US 10,882,090 B2
(45) Date of Patent: Jan. 5, 2021

(54) METHOD FOR FORMING A HOLLOW OF A FERRITIC FECRAL ALLOY INTO A TUBE

(71) Applicant: Sandvik Materials Technology Deutschland GmbH, Düsseldorf (DE)

(72) Inventors: Thomas Froböse, Versmold (DE); Fernando Rave, Västerås (SE); Jonas Gynnerstedt, Järbo (SE)

(73) Assignee: Sandvik Materials Technology Deutschland GmbH, Düsseldorf (DE)

( * ) Notice: Subject to any disclaimer, the term of this patent is extended or adjusted under 35 U.S.C. 154(b) by 0 days.

(21) Appl. No.: 16/312,535

(22) PCT Filed: Jun. 22, 2017

(86) PCT No.: PCT/EP2017/065476
§ 371 (c)(1),
(2) Date: Dec. 21, 2018

(87) PCT Pub. No.: WO2017/220757
PCT Pub. Date: Dec. 28, 2017

(65) Prior Publication Data
US 2019/0193131 A1 Jun. 27, 2019

(30) Foreign Application Priority Data
Jun. 24, 2016 (DE) .......................... 10 2016 111 591

(51) Int. Cl.
*B21B 21/00* (2006.01)
*B21B 3/00* (2006.01)
(Continued)

(52) U.S. Cl.
CPC ............... *B21B 21/00* (2013.01); *B21B 3/00* (2013.01); *B21C 1/003* (2013.01); *B21C 1/24* (2013.01);
(Continued)

(58) Field of Classification Search
CPC ... B21B 21/00; B21B 2045/026; B21B 23/00; B21C 1/003; B21C 1/22; B21C 1/24;
(Continued)

(56) References Cited

U.S. PATENT DOCUMENTS 5,253,678 A * 10/1993 Furugen .................... B21C 1/24
138/177
5,377,515 A * 1/1995 Baensch ................ B21B 21/00
72/12.2

(Continued)

FOREIGN PATENT DOCUMENTS

CN     102803454 A     11/2012
CN     102985783 A     3/2013
(Continued)

OTHER PUBLICATIONS

International Search Report and Written Opinion dated Aug. 23, 2017, issued in corresponding International Patent Application No. PCT/EP2017/065476.
(Continued)

*Primary Examiner* — Edward T Tolan
(74) *Attorney, Agent, or Firm* — Morgan, Lewis & Bockius LLP

(57) ABSTRACT

The present invention relates to a method for forming a hollow 26 of a ferritic FeCrAl alloy into a tube 2. While tubes made of powder metallurgical, dispersion hardened, ferritic FeCrAl alloys are commercially available, hollows made of FeCrAl alloys so far can hardly be formed into tubes of small dimensions. The major reason for the problems in forming hollows of a ferritic FeCrAl alloy into a finished product is that FeCrAl alloys are brittle. It is therefore an aspect of the present invention to provide a tube 2 made of a ferritic FeCrAl alloy having arbitrary small dimensions. Furthermore, it is an aspect of the present invention to provide a machine 1 and a method for forming
(Continued)

a tubular hollow 26 into a finished tube 2 of a ferritic FeCrAl alloy. At least one of the above aspects is addressed by a method for forming a hollow into a tube 2 comprising the steps providing the hollow 26 of a ferritic FeCrAl alloy, heating the hollow 26 to a temperature in a range from 90° C. to 150° C., and forming the heated hollow 26 by pilger milling or drawing into the tube.

19 Claims, 3 Drawing Sheets

(51) Int. Cl.
    *B21C 1/00* (2006.01)
    *B21C 1/24* (2006.01)
    *C21D 8/10* (2006.01)
    *C21D 9/08* (2006.01)
    *C21D 1/42* (2006.01)
    *B21C 9/00* (2006.01)
    *C21D 6/00* (2006.01)
    *C22C 38/00* (2006.01)
    *C22C 38/02* (2006.01)
    *C22C 38/04* (2006.01)
    *C22C 38/06* (2006.01)
    *C22C 38/22* (2006.01)
    *C22C 38/26* (2006.01)
    *C22C 38/28* (2006.01)
    *F16L 9/02* (2006.01)

(52) U.S. Cl.
    CPC ............... *B21C 9/00* (2013.01); *C21D 1/42* (2013.01); *C21D 6/002* (2013.01); *C21D 6/005* (2013.01); *C21D 6/008* (2013.01); *C21D 8/105* (2013.01); *C21D 9/08* (2013.01); *C22C 38/001* (2013.01); *C22C 38/002* (2013.01); *C22C 38/02* (2013.01); *C22C 38/04* (2013.01); *C22C 38/06* (2013.01); *C22C 38/22* (2013.01); *C22C 38/26* (2013.01); *C22C 38/28* (2013.01); *F16L 9/02* (2013.01); *B21B 2003/001* (2013.01); *C21D 2211/005* (2013.01); *Y02P 10/25* (2015.11)

(58) Field of Classification Search
    CPC .... B21C 1/26; B21C 3/16; B21C 9/00; B21C 9/02; C22C 38/06; C22C 38/18
    See application file for complete search history.

(56) References Cited

U.S. PATENT DOCUMENTS

| | | | |
|---|---|---|---|
| 6,296,953 | B1 | 10/2001 | Lindén et al. |
| 6,692,585 | B2* | 2/2004 | Uehara .................. C22C 38/004 |
| | | | 148/325 |
| 6,761,751 | B2* | 7/2004 | Berglund ............ C22C 33/0285 |
| | | | 148/325 |
| 8,507,416 | B2 | 8/2013 | Hatasaki et al. |
| 9,080,230 | B2* | 7/2015 | Hahn ...................... C22C 38/06 |
| 9,482,302 | B2* | 11/2016 | Toyotake ................. B21B 1/42 |
| 9,839,949 | B2 | 12/2017 | Frobose et al. |
| 10,488,038 | B2 | 11/2019 | Toyoda et al. |
| 2010/0289194 | A1* | 11/2010 | Chandrasekaran .... C21D 6/002 |
| | | | 266/249 |
| 2012/0083432 | A1* | 4/2012 | Hatasaki ................... B21J 3/00 |
| | | | 508/176 |
| 2013/0118420 | A1* | 5/2013 | Toyoda ..................... C22F 1/10 |
| | | | 122/235.14 |
| 2015/0174631 | A1* | 6/2015 | Sakihama .............. G03G 5/102 |
| | | | 72/20.1 |
| 2016/0199893 | A1 | 7/2016 | Frobose |
| 2016/0273683 | A1* | 9/2016 | Silveira E Silva ..... F16L 58/08 |
| 2017/0246670 | A1* | 8/2017 | Jang ........................ B21C 37/06 |

FOREIGN PATENT DOCUMENTS

| | | |
|---|---|---|
| CN | 104384191 A | 3/2015 |
| CN | 104862593 A | 8/2015 |
| CN | 105228763 A | 1/2016 |
| DE | 10 2013 109 218 A1 | 2/2015 |
| GB | 691887 A | 5/1953 |
| WO | 99/10554 A1 | 3/1999 |
| WO | 2009/047688 A2 | 4/2009 |
| WO | 2016/024702 A1 | 2/2016 |

OTHER PUBLICATIONS

First Office Action in corresponding application CN 201780038738.9 dated Nov. 1, 2019.

Office Action issued in corresponding Chinese Patent Application No. 201780038738.9 dated Aug. 24, 2020.

* cited by examiner

METHOD FOR FORMING A HOLLOW OF A FERRITIC FECRAL ALLOY INTO A TUBE

The present invention relates to a tube made of a ferritic iron chromium aluminium alloy (FeCrAl alloy). The present invention furthermore relates to a machine for forming a hollow of a ferritic FeCrAl alloy into a tube as well as a method for forming a hollow into a tube.

FeCrAl alloys provide a heat resistance up to approximately 1450° C. while at the same time providing an extraordinarily good form stability as well as resistance against corrosion.

While tubes made of powder metallurgical, dispersion hardened, ferritic FeCrAl alloys are commercially available, hollows made of FeCrAl alloys so far can hardly be formed into tubes of small dimensions. The major reason for the problems in forming hollows of a ferritic FeCrAl alloy into a finished product is that FeCrAl alloys are brittle.

This is in particular problematic as the powder metallurgical production has constrains regarding the dimensions of tubes extruded.

It is therefore an aspect of the present invention to provide a tube made of a ferritic FeCrAl alloy having arbitrary small dimensions. Furthermore, it is an aspect of the present invention to provide a machine and a method for forming a tubular hollow into a finished tube of a ferritic FeCrAl alloy.

At least one of the above aspects is solved by a tube made of a ferritic FeCrAl alloy obtained by a method comprising the steps of providing a hollow of a ferritic FeCrAl alloy, heating the hollow to a temperature in range from 90° C. to 150° C., and forming the heated hollow by pilger milling or by drawing into the tube.

At least one of the above aspects is also solved by a machine for forming a hollow of the ferritic FeCrAl alloy into a tube comprising a heating equipment for the hollow, and a pilger mill or a drawing equipment, wherein the heating equipment for the hollow is arranged in front of an infeed of the pilger mill or of the drawing equipment, and wherein the heating equipment is arranged to heat the hollow during operation of the machine to a temperature in a range from 90° C. to 150° C.

Furthermore, at least one of the above aspects is solved by a method for forming a hollow into a tube comprising the steps providing the hollow of a ferritic FeCrAl alloy, heating the hollow to a temperature in a range from 90° C. to 150° C., and forming the heated hollow by pilger milling or drawing into the tube.

In one embodiment, according to the present method as defined hereinabove or hereinafter, the hollow prior is heated in the beginning of the forming process by pilger milling or drawing to a temperature in a range from 100° C. to 135° C., in another embodiment to a temperature in a range from 110° C. to 130° C. and in a further embodiment to a temperature at about 125° C.

Cold forming processes are used for forming a metallic hollow into a tube. By the cold forming the final tube not only changes its properties due to strain hardening going along with the cold forming, but the tube's wall thickness is reduced as is its inner and outer diameter. By cold forming a hollow into a tube, a tube with exact dimensions can be manufactured.

So far, tubular hollows of a ferritic FeCrAl alloy cannot be cold worked by pilger milling or drawing because of their brittleness and any attempts to cold pilger mill or to cold draw a ferritic FeCrAl alloy will lead to a destruction of the hollow.

Hot working of tubes at temperatures above 150° C. typically does not lead to the desired results due to the fact that working of metals above 150° C. requires more complicated approaches in order to provide lubrication between the hollow and the tool, i.e. the rollers of the pilger mill or the drawing die or mandrel.

Surprisingly, it has been found that a hollow of a ferritic FeCrAl alloy can be worked into a tube using the techniques known as cold forming or cold working, when the hollow immediately before its infeed into the pilger mill or the drawing equipment i.e. before coming into engagement with the tool for cold forming, is heated to a temperature in a range from 90° C. to 150° C. Expressed in other words, the hollow when coming into engagement with the tool for pilger milling or drawing is at a temperature in a range from 90° C. to 150° C. This temperature avoids destruction of the hollow during the forming process while still being cold enough in order to use conventional lubricants typically used for cold forming. In an embodiment, thus no further element is located between the heating equipment and the infeed of the pilger mill or of the drawing equipment.

By use of the method according to the invention, tubes of a ferritic FeCrAl alloy can be manufactured having an outer diameter of 25 mm or less. This outer diameter of 25 mm or less cannot be achieved by extruding a billet into a tube of a FeCrAl alloy. In an embodiment, the present invention enables manufacturing of tubes of a FeCrAl alloy having an outer diameter of 10 mm or less.

In an embodiment, the ferritic FeCrAl alloy comprises, in wt-%, Cr 9 to 25, Al 3 to 7, Mo 0 to 5, C 0 to 0.08, Si 0 to 3.0, Mn 0 to 0.5, balance Fe. In an embodiment, the ferritic FeCrAl alloy further comprises normally occurring impurities.

In an embodiment, the ferritic FeCrAl alloy further comprises, in wt-%, Y 0.05 to 0.60, Zr 0.01 to 0.30, and Hf 0.05 to 0.5.

In an embodiment the content of Mo, C, Si, and Mn is larger than 0 wt-%.

In another embodiment, the ferritic FeCrAl alloy comprises, in wt-%, Cr 9 to 25, Al 3 to 7, Mo 0 to 5, Y 0.05 to 0.60, Zr 0.01 to 0.30, Hf 0.05 to 0.50, Ta 0.05 to 0.50, Ti 0 to 0.10, C 0.01 to 0.05, N 0.01 to 0.06, O 0.02 to 0.10, Si 0.10 to 3.0, Mn 0.05 to 0.50, P 0 to 0.8, S 0 to 0.005, balance Fe. In an embodiment the ferritic FeCrAl alloy further comprises normally occurring impurities.

In the above embodiments the compositions of the FeCrAl alloy may further comprise additional elements or substances in concentrations, wherein these elements or substances do not change the specific properties of a FeCrAl alloy as outlined in this application. In this case the term "balance Fe" denotes the balance to 100% in addition to mandatory elements according to the embodiments plus optional elements or substances.

Alloys falling into the above specifications are characterized by an extraordinary heat resistance, form stability as well as resistance against corrosion.

Applications for tubes of FeCrAl alloys are high temperature furnaces for firing of ceramics, annealing furnaces and furnaces for the electronics industry.

In an embodiment, forming of a hollow of a ferritic FeCrAl alloy into a tube at temperatures above room temperature requires a detailed consideration of lubricants used in order to reduce friction between the tool and the hollow. Thus, in an embodiment of the present invention, prior to the step of heating at least an outer surface of the hollow is coated with a polymer serving as a lubricant.

In an embodiment the polymer is applied onto the hollow as a polymer suspension in order to coat the hollow. In an embodiment the suspension is water based. In a further embodiment the suspension is free of a substance selected from organic solvents, fluorine, chlorine, sulphur or any combination thereof.

In an embodiment, the polymer is coated by spraying the polymer or polymer suspension onto the hollow or by dipping the hollow into the polymer or polymer suspension prior to the step of heating.

In a further embodiment, in order to provide a polymer coating the hollow prior to the step of heating is coated with a polymer serving as a lubricant by immersing the hollow into a polymer suspension. In an embodiment of the invention the concentration of the polymer in the suspension is in a range from 30 wt-% to 50 wt-%. In a further embodiment the temperature of the polymer suspension during immersion of the hollow is in a range from 55° C. to 60° C. In an embodiment the hollow is immersed for period of time in a range from 4 minutes to 8 minutes.

If a polymer suspension is applied onto the hollow, in an embodiment the hollow is dried afterwards and before heating thereof. This way a dried polymer film is provided on the surface of the hollow.

In an embodiment the thickness of the dried film is in a range from 4 g/m² to 6 g/m². In an embodiment the hollow is dried with warm air.

In an embodiment, the hollow of the ferritic FeCrAl alloy experiences corrosion during the time between manufacturing of the hollow and forming the hollow into a tube according to the present invention. Thus in an embodiment of the present invention, the hollow is blasted prior to the coating.

Blasting in an embodiment might be carried out with any abrasive particles, like sand or glass.

In an embodiment, wherein during the step of forming the hollow is drawn through a drawing die and over a mandrel in order to define final dimensions of the tube, prior to the coating the hollow is blasted on an inner surface, only. Surprisingly, blasting of the hollow prior to the coating with a polymer serving as a lubricant leads to the best results once the blasting is only effected on the inner surface of the hollow.

In another embodiment, during the step of forming an oil-based lubricant is applied onto the hollow. In an embodiment, the oil-based lubricant is applied in addition to the polymer coating, i.e. on top of the polymer coating. As an oil-based lubricant for drawing any known drawing oil for cold drawing could be used. For pilger milling any known oil-based lubricant suitable for cold pilger milling could be used.

In an embodiment of the present invention, wherein during the step of forming the hollow is drawn through a drawing die and over a mandrel, the oil-based lubricant is applied onto an outer surface of the hollow, only. Surprisingly, even though a mandrel is used, the oil-based lubricant advantageously is only applied on the outside surface of the hollow.

In an embodiment of the invention, the step of providing the hollow includes extrusion of the hollow from a billet. The billet in turn in an embodiment is manufactured either by a powder metallurgical process or by casting.

In an embodiment of the present invention, forming of the heated hollow into the tube is performed by pilger milling.

Pilger milling is a widely used method to reduce the dimensions of a tube. Pilger milling as it is considered here, in the prior art is performed at room temperature and thus is known as cold pilger milling. During pilger milling in a method according to the present invention, the hollow is pushed over a calibrated mandrel defining the inner diameter of the finished tube. The bellow is engaged by two calibrated rollers defining the outer diameter of the tube. The rollers roll the hollow in a longitudinal direction over the mandrel.

At the beginning of the pilger milling process, the hollow is moved by a driver into the chuck of the feeder. At a front point of return of the roll stand in the feed direction of the hollow, the rollers have an angular position in which the hollow can be inserted into the infeed pockets of the rollers and can be located between the rollers. The two rollers being vertically mounted above each other at the roll stand, roll over the hollow by rolling back and forth in a direction parallel to the feed direction of the hollow. During the motion of the roll stand between the front point of return and the rear point of return, the rollers stretch out the hollow over the mandrel mounted inside the hollow.

The rollers and the mandrel are calibrated such that the gap formed between the rollers and the mandrel in the section of the rollers denoted as the working caliber is continuously reduced from the wall thickness of the hollow prior to the forming to the wall thickness of the completely rolled tube. Furthermore, the outer diameter defined by the rollers is reduced from the outer diameter of the hollow to the outer diameter of the finished tube. In addition, the inner diameter defined by the mandrel is reduced from the inner diameter of the hollow to the inner diameter of the finished tube. Further to the working caliber, the rollers comprise a planing caliber. The planing caliber neither reduces the wall thickness of the tube nor the inner or the outer diameter of the tube, but is used for planing the surfaces of the tube to be manufactured. When the rollers have reached the rear point of return of the roll stand, the rollers are at an angular position, wherein the rollers form an escape pocket to bring the rollers out of engagement with the tube.

A feeding of the hollow in the feed direction occurs either at the front point of return of the roll stand or at the front point of return as well as at the rear point of return of the roll stand. In an embodiment, each section of the hollow can be rolled multiple times. In this embodiment, the steps of feeding the hollow in the feed direction are significantly smaller than the path of the roll stand from the front point of return to the rear point of return. By rolling each section of the tube multiple times, a uniform wall thickness and roundness of tube, a high surface quality of the tube as well as uniform inner and outer diameters can be achieved.

In order to obtain a uniform shape of the finalized tube, the hollow in addition to a stepwise feeding experiences an intermittent rotation about its axis of symmetry. Rotation of the hollow in an embodiment is provided at at least one point of return of the roll stand, i.e. once the hollow is out of engagement with the rollers at the infeed pockets and release pockets, respectively.

An alternative method to form the hollow into a tube according to the present invention is denoted as drawing. Drawing as it is considered here, in the prior art is performed at room temperature and thus is known as cold drawing.

When a hollow is drawn into a finished tube, different methods can be applied as embodiments of the present invention, i.e. hollow drawing, core drawing and rod drawing. During the process of hollow drawing, only the outer diameter of the hollow is reduced by drawing the hollow through a drawing die without further defining the inner diameter of the tube. During core drawing and rod drawing, simultaneously the inner diameter and the wall thickness of the drawn tube are defined by a mandrel. Either the mandrel is not fixed but held by the hollow itself or in rod drawing the mandrel is held by a rod extending through the inner diameter of the hollow. In an embodiment, wherein a mandrel is applied during the drawing process, the drawing die and the mandrel define a ring-shaped gap through which the hollow is drawn. When using a mandrel, the outer diameter, the inner diameter as well as the wall thickness may be reduced during the drawing process and the final tube has diameters within tight tolerances. A drawing equipment can either be continuously or discontinuously operated. During the drawing process, the work piece is clamped by a drive on the side of the drawing die, where the finalized tube can be gripped. In order to continuously draw a hollow into a tube, the drawing equipment in an embodiment needs at least two drawing drives alternately clamping the tube in order to continuously draw the tube through the drawing die.

In an embodiment of the invention, the drawing equipment is a drawing bench.

In an embodiment of the invention, the tube after the step of forming the hollow into the tube is straightened in a straightening machine, wherein prior to the infeed into the straightening machine the tube is again heated to a temperature in a range from 90° C. to 150° C. In another embodiment, the hollow prior to the beginning of the straightening is heated to a temperature in a range from 100° C. to 135° C., in another embodiment to a temperature in a range from 110° C. to 130° C. and in a further embodiment to a temperature at 125° C.

Further advantages, embodiments and applications of the present invention will become apparent from the subsequent description of embodiments thereof as well as the attached figures.

In the figures, identical elements have been denoted by identical reference numbers.

Figure 1:
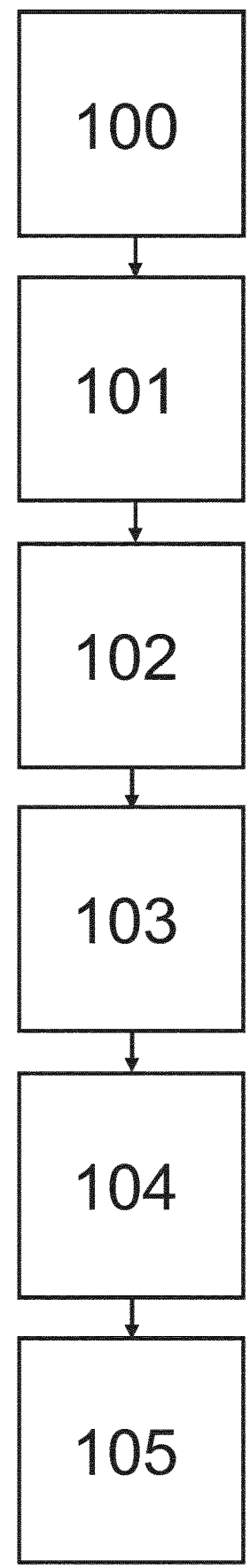
FIG. 1 is a flow chart of a method according to an embodiment of the present invention.

FIG. 1 is a flow chart describing a method for forming a hollow into a tube according to an embodiment of the present invention. In a first step 100, a hollow of a ferritic FeCrAl alloy is provided. In the case of the presently described embodiment, consists of in wt-%, Cr 12 to 25, Al 3 to 7, Mo 0 to 5, C 0 to 0.08, Si 0 to 0.7, Mn 0 to 0.4, Y 0.05 to 0.60, Zr 0.01 to 0.30, Hf 0.05 to 0.5, while the balance being Fe, and normally occurring impurities.

This FeCrAl alloy has an extraordinary heat resistance, form stability and resistance against corrosion.

In order to be able to draw the hollow provided in step 100, the hollow in step 101 is glass blasted on its inner surface, only. By glass blasting the inner surface, any corrosion on the inner surface is ablated. Surprisingly, a blasting of the hollow on its outer surface does not further enhance the properties of the finished tube.

After blasting, the hollow in step 102 is immersed into a water based polymer suspension. By immersing the hollow into the polymer suspension, the polymer suspension coats the hollow. After drying of the hollow in warm air in step 103, the polymer contained in the polymer suspension coats the entire hollow as a film and serves as a lubricant for the hollow during the forming thereof into a tube. In case of the presently described embodiment, the polymer suspension used for coating the hollow is a product denoted as GARDOMER L6332 of Chemetall of Frankfurt, Germany.

After the coating has been dried, the coated hollow is fed into a drawing bench as a drawing equipment in the sense of the present application in order to form the hollow into a tube.

Figure 2:
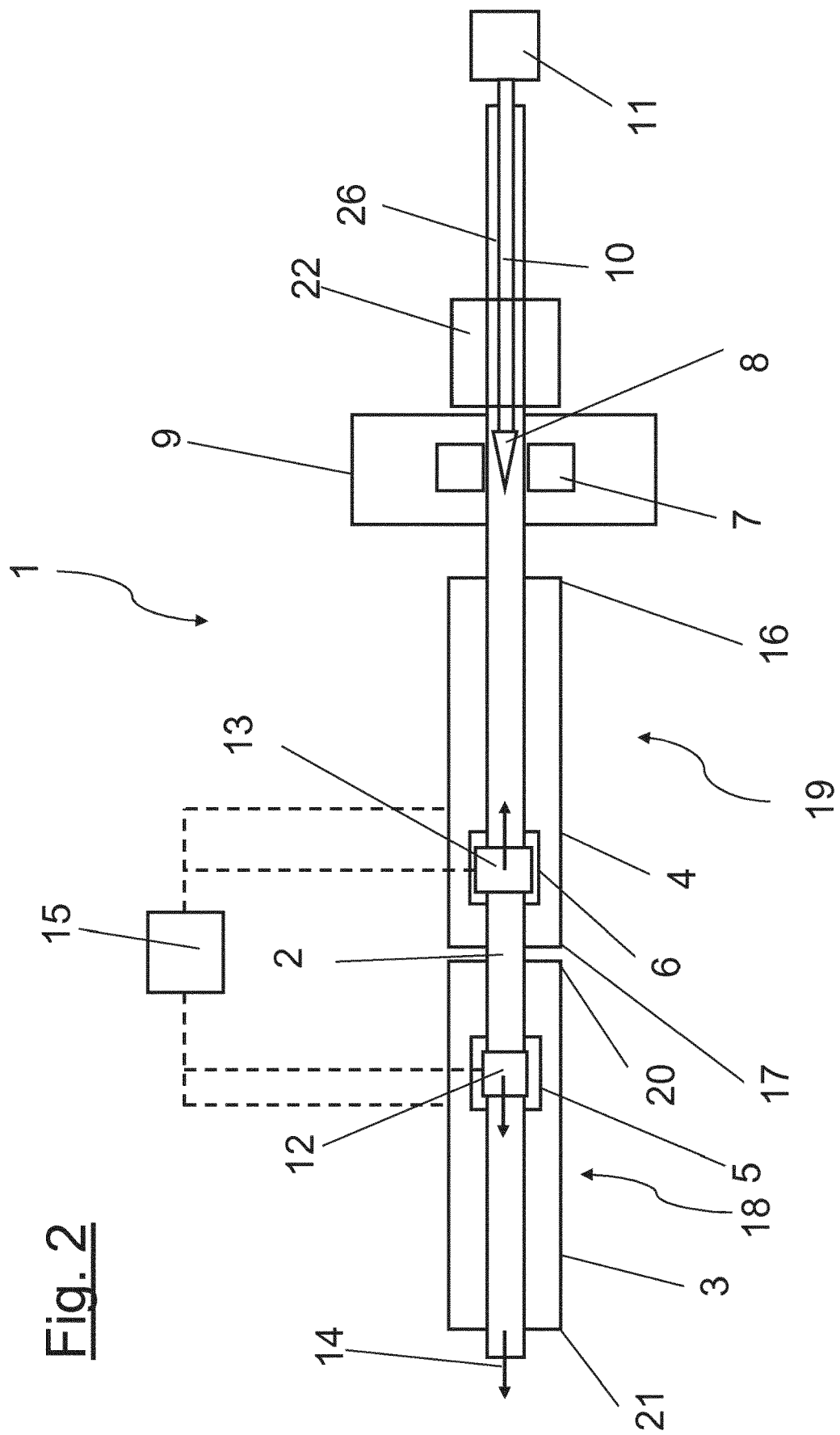
FIG. 2 is a schematic side view of a continuously operating drawing bench according to an embodiment of the present invention.
Figure 3:
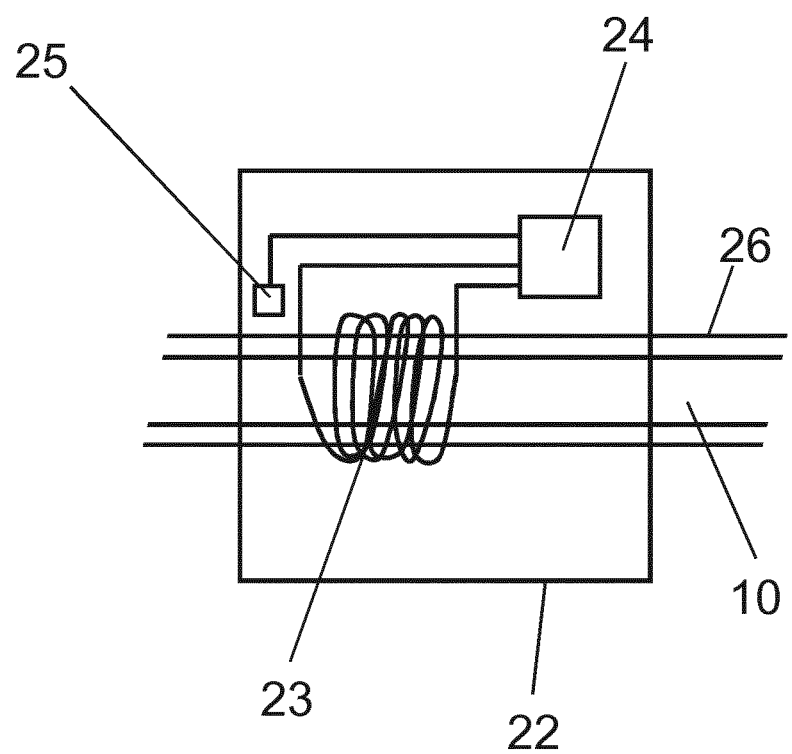
FIG. 3 is a schematic enlarged broken side view of the heating equipment of FIG. 2.

An embodiment of a drawing bench as used in an embodiment of the present invention is depicted in FIGS. 2 and 3.

In order to be able to draw the brittle material through a gap provided between a drawing die 7 and a mandrel 8, the hollow in step 104 is heated to a temperature of 125° C., wherein the temperature is measured right before the tube enters the forming zone 9 defined by the tools, i.e. by the drawing die 7 and the mandrel 8. Finally, the hollow is drawn in step 105 through the gap defined by the drawing die 7 and the mandrel 8. Simultaneously with the drawing of the hollow into the tube, a lubricant is applied to the outer surface of the hollow. In the described embodiment of the present invention, the oil-based lubricant applied to the outer surface of the hollow is a drawing oil available for cold drawing.

In FIG. 2, a machine for forming the tubular hollow as described above for the process according to an embodiment of the invention into a tube is schematically depicted. The machine for forming the hollow into a tube is a conventional continuously operating drawing bench 1, wherein in the drawing direction in front of the process zone 9, a heating equipment 22 is located. This heating equipment 22 is arranged to heat a hollow 26 to a temperature in a range from 90° C. to 150° C., wherein the exact temperature can be chosen depending on the exact material of the tubular hollow as well as the polymer chosen for the lubricating coating.

FIG. 2 is a schematic view of a continuously operating drawing bench 1. The essential elements of the drawing bench 1 are two drawing devices 18, 19 as well as the drawing tools 7, 8. Each of the drawing devices 18, 19 has a linear motor 3, 4, a drawing carriage 5, 6 driven by the linear motor 3, 4 and a clamping cylinder 12, 13 on the drawing carriage 5, 6, respectively.

In the illustrated embodiment, a drawing die 7, and a drawing mandrel 8 are arranged in the process zone 9 of the drawing bench 1. While the drawing die 7 serves to define the outer diameter of the tube 2, the drawing mandrel 8 defines the inner diameter of the tube 2. The mandrel 8 is held on a mandrel bar 10 which in turn is received on a mandrel bar holder 11 and extends through the hollow 26. The hollow 26 is defined as the part of the tube, which is not yet formed, i.e. is located in front of the process zone 9 when viewed in the drawing direction 14. Denoted by reference number 2 is the formed part of the tube.

On each of the drawing carriages 5, 6 a clamping cylinder 12, 13 is mounted which concentrically clamps the tube 2.

The drawing bench 1 also has a central controller 15 which is connected via control lines to the linear motors 3, 4 as well as to the hydraulic controls for the clamping cylinders 12, 13.

In order to allow a detailed understanding of the drawing process, the flow of a hollow 26 to the finished tube 2 of FeCrAl alloy will now be described with reference to FIG. 1.

The end of the hollow is fed through the clamping cylinder 13 of the drawing carriage 6 of the first drawing device 19, clamped by the clamping cylinder 13 and gripped. In this stage of the drawing process, the drawing carriage 6 is in its tool-sided end position 16 adjacent to the process zone 9.

The drawing force required for forming is then applied by the linear motor 4 and the tube is drawn through the annular gap formed between the drawing die 7 and drawing mandrel 8. The hollow 26 is fed forward in the drawing direction 14 until it extends through the clamping cylinder 12 on the drawing carriage 5 of the second drawing device 18.

Once the drawing carriage 6 of the second linear motor 4 reaches its left end position 17 in FIG. 1, the controller 15 initiates the clamping cylinder 13 to open and simultaneously the clamping cylinder 12 of the second drawing device 18 to close. At the same time the drawing carriage 12 of the second drawing device 18 begins to move the tube 2 in the drawing direction 14 the drawing carriage 5 moves the second drawing device 18 from the first its end position 20 closest to the process zone 9 to the second end position 21. At the same time the drawing carriage 6 of the drawing device 19 returns to its initial position, i.e. to first end position 16.

This interplay between the two drawing devices 18, 19 is repeated until the tube 2 has been fully drawn through the annular gap between the drawing die 7 and drawing mandrel 8.

FIG. 3 shows a more detailed view of the heating equipment 22. The heating equipment 22 contains a conductive coil 23, wherein the hollow 26 extends in a longitudinal direction through the winding of the coil 23. By applying an AC current through the coil 23, currents are induced in the hollow 26, which in turn lead to a heating of the hollow 26. In order to provide a controlled current flow through the coil 23, the coil 23 is electrically connected to a driver 24. The driver 24 provides the appropriately controlled AC power to the coil 23 while simultaneously obtaining a measurement input from a laser thermometer 25. The laser thermometer 25 is also electrically connected to the driver 24 in order to control the current through the coil 23 such that the hollow 26 in a feed direction of the hollow 26 behind the coil 23 has the defined temperature of 125° C. Measurement of the temperature of the hollow 26 by the thermometer 25 occurs directly in front of the process zone 9 of the drawing bench 1 as depicted in FIG. 2.

For purposes of the original disclosure it is pointed out that all features as they become apparent from the description, the drawings and the claims for a skilled person, even if they have been described specifically only in connection with certain other features, both individually and in any combinations with others of the features disclosed herein or groups of features can be combined, unless this has been expressly excluded or technical factors make such combinations impossible or meaningless. A comprehensive explicit representation of all conceivable combinations of features is omitted only in order ensure brevity and readability of the present application.

While the invention has been illustrated and described in detail in the drawings and the foregoing description, this illustration and description is merely exemplary and is not intended as a limitation of the scope of protection as it is defined by the claims. The invention is not limited to the disclosed embodiments.

Modifications of the disclosed embodiments will be apparent to those skilled in the art from the drawings, the description and the appended claims. In the claims the word "comprise" does not exclude other elements or steps, and the indefinite article "a" or "an" does not exclude a plurality. The mere fact that certain features are claimed in different claims does not exclude their combination. Reference signs in the claims are not intended as limiting the scope of protection.

LIST OF REFERENCE NUMBERS 1 drawing bench
2 tube
3, 4 linear motor
5, 6 drawing carriage
7 drawing die
8 mandrel
9 process zone
10 mandrel bar
11 mandrel bar holder
12, 13 clamping cylinder
14 drawing direction
15 controller
16 tool-sided end position
17 left end position
18, 19 drawing device
20 first end position
21 second end position
22 heating equipment
23 conductive coil
24 driver
25 laser thermometer
26 hollow
100 providing the hollow
101 blasting step
102 coating step
103 drying step
104 heating step
105 drawing step

The invention claimed is:

1. A method for forming a hollow into a tube, comprising the steps of:
manufacturing a billet of a ferritic FeCrAl alloy by a powder metallurgical process;
forming a hollow from the billet of ferritic FeCrAl alloy;
heating the hollow to a temperature in a range from 90° C. to 150° C.; and
forming the heated hollow by pilger milling or drawing into the tube, wherein the tube has an outer diameter of 25 mm or less, and wherein the ferritic FeCrAl alloy comprises, in wt-%:
Cr 9 to 25,
Al 3 to 7,
Mo 0 to 5,
C 0 to 0.08,
Si 0 to 3.0,
Mn 0 to 0.5,
balance Fe.

2. The method according to claim 1, wherein prior to the step of heating at least an outer surface of the hollow is coated with a polymer serving as a lubricant.

3. The method according to claim 2, wherein prior to the step of heating the hollow is coated with a polymer serving as a lubricant by immersing the hollow into a polymer suspension and drying of the hollow after immersion.

4. The method according to claim 2, wherein the hollow is blasted prior to the coating.

5. The method according to claim 2, wherein during the step of forming the hollow is drawn through a drawing die and over a mandrel, and wherein prior to the coating the hollow is blasted on an inner surface, only.

6. The method according to claim 1, wherein during the step of forming an oil based lubricant is applied onto the hollow.

7. The method according to claim 6, wherein during the step of forming the hollow is drawn through a drawing die and over a mandrel, and wherein the oil based lubricant is applied onto an outer surface of the hollow, only.

8. The method according to claim 1, wherein in the step of providing the hollow, the hollow is extruded from a billet.

9. The method according to claim 1, wherein the tube has an outer diameter of 10 mm or less.

10. The method according to claim 1, wherein the step of heating the hollow includes feeding the hollow through an induction coil in a longitudinal direction of the induction coil.

11. The method according to claim 1, wherein no further working of the hollow occurs between the step of heating the hollow to a temperature in a range from 90° C. to 150° C. and the step of forming the heated hollow by pilger milling or drawing into the tube.

12. A method according to claim 6, for forming a hollow into a tube, comprising the steps of:
    manufacturing a billet of a ferritic FeCrAl alloy by a powder metallurgical process;
    forming a hollow from the billet of ferritic FeCrAl alloy;
    heating the hollow to a temperature in a range from 90° C. to 150° C.; and
    forming the heated hollow by pilger milling or drawing into the tube, wherein the tube has an outer diameter of 25 mm or less, and wherein the ferritic FeCrAl alloy comprises, in wt-%:
    Cr 9-25,
    Al 3-7,
    Mo 0-5,
    Y 0.05-0.60,
    Zr 0.01-0.30,
    Hf 0.05-0.50,
    Ta 0.05-0.50,
    Ti 0-0.10,
    C 0.01-0.05,
    N 0.01-0.06,
    O 0.02-0.10,
    Si 0.10-3.0,
    Mn 0.05-0.50,
    P 0-0.8,
    S 0-0.005,
    balance Fe.

13. The method according to claim 12, wherein prior to the step of heating at least an outer surface of the hollow is coated with a polymer serving as a lubricant.

14. The method according to claim 13, wherein prior to the step of heating the hollow is coated with a polymer serving as a lubricant by immersing the hollow into a polymer suspension and drying of the hollow after immersion.

15. The method according to claim 13, wherein the hollow is blasted prior to the coating.

16. The method according to claim 13, wherein during the step of forming the hollow is drawn through a drawing die and over a mandrel, and wherein prior to the coating the hollow is blasted on an inner surface, only.

17. The method according to claim 12, wherein the tube has an outer diameter of 10 mm or less.

18. The method according to claim 12, wherein the step of heating the hollow includes feeding the hollow through an induction coil in a longitudinal direction of the induction coil.

19. The method according to claim 12, wherein no further working of the hollow occurs between the step of heating the hollow to a temperature in a range from 90° C. to 150° C. and the step of forming the heated hollow by pilger milling or drawing into the tube.

* * * * *